April 30, 1963                    W. L. GARBERDING                    3,087,360
                        CUTTING TOOL HAVING UNIVERSAL JOINT
Filed July 19, 1960                                               2 Sheets-Sheet 2
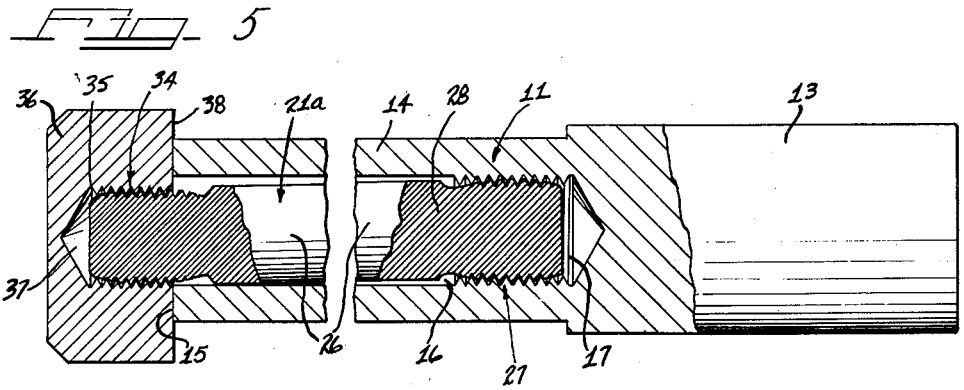
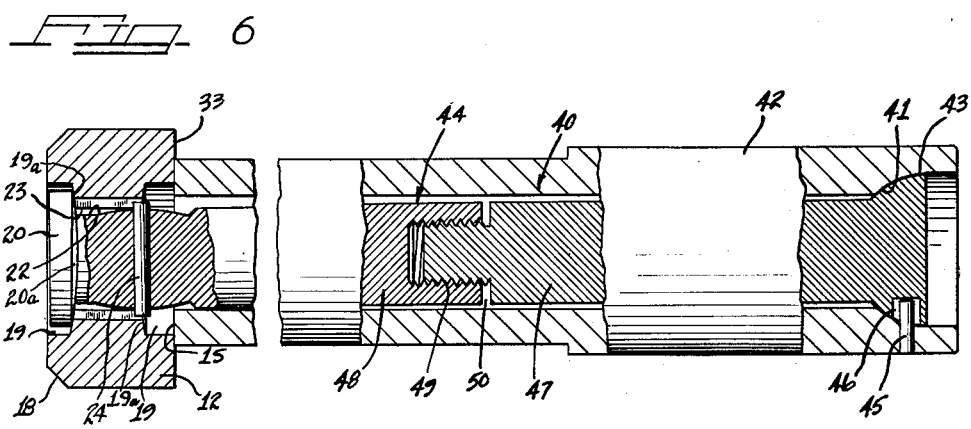
Inventor
Waldo L. Garberding United States Patent Office 3,087,360
Patented Apr. 30, 1963

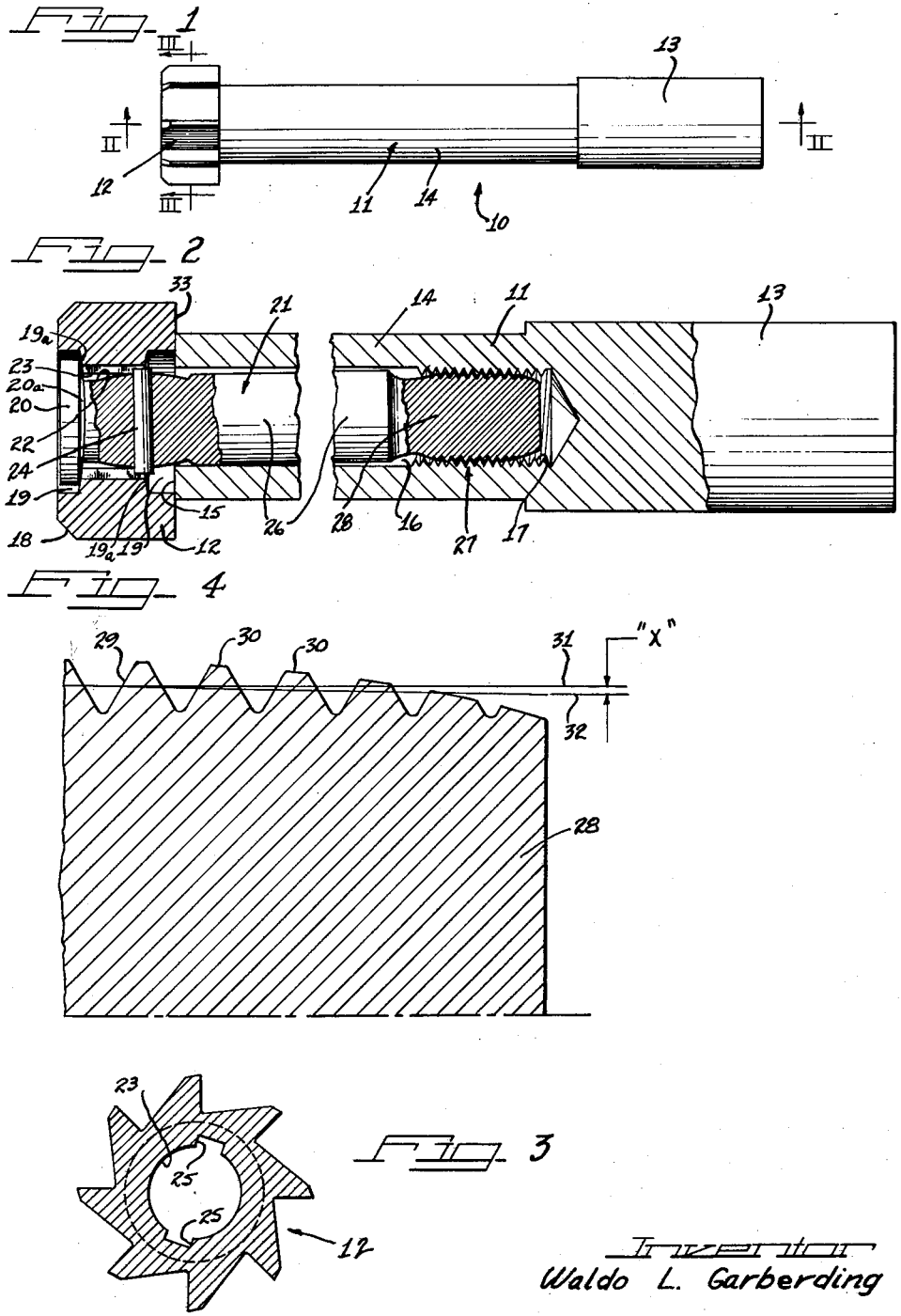

3,087,360
CUTTING TOOL HAVING UNIVERSAL JOINT
Waldo L. Garberding, 500 E. Austin, Libertyville, Ill.
Filed July 19, 1960, Ser. No. 43,912
13 Claims. (Cl. 77—75)

This invention relates generally to cutting tools, and more specifically to an improved cutting tool having a removable generally circular cutting head incorporated therein, the tool being provided with a universal or swivel joint.

Although the principles of the present invention may be included in various devices, a particularly useful application is made in reamers which are used for producing a high-grade finish in a hole, and which are used to finish the inside of an aperture to close tolerances.

Where tools such as reamers are employed in certain types of machine tool, not infrequently the geometric center of the cutter does not coincide precisely with the geometric center of a hole or aperture which is to be reamed. This problem is particularly acute where a number of chucks or holding devices are carried by an indexible tool head and are presented successively in response to indexing of such head, to engage the workpiece. Turret lathes and screw machines are representative of this type of machine tool. When the indexible head is moved to a position where a cutting tool supported by it should precisely register with the workpiece, any misalignment between the axis of the cutting tool and the axis of the workpiece results in improper machining of the workpiece. However, the various stop or indexing means employed within the machine tool to position the indexible head are inherently subject to wear and so that in time, such a misalignment may be expected as a matter of course.

The present invention provides a cutting tool of the reamer type which may be employed in such machine tools, the instant cutting tool comprising an assembly of components which are so constructed and arranged as to become properly aligned by the workpiece to compensate for any inherent misalignment between the workpiece holding means and the cutting tool holding means. Further, the instant invention is so constructed and arranged that not only is the cutting tool automatically aligned by the workpiece, but the first workpiece also locks the cutting tool in position whereby the inherent misalignment in the machine tool is compensated for, the cutter and subsequent workpieces coming into engagement with each other in perfect alignment. The foregoing has been accomplished in a manner wherein only a small comparatively inexpensive portion of the cutting tool needs to be replaced from time to time, such as for sharpening, to allow for workpiece rotation in the opposite direction, or to effect chip movement in the desired axial direction.

Accordingly, it is an object of this invention to provide a novel cutting tool capable of self alignment.

It is a further object of the present invention to provide a cutting tool capable of locking itself into the proper fixed position.

A still further object of the present invention is to provide a cutting tool which is both self aligning and self locking in the proper position.

A still further object of the present invention is to provide a cutting tool employing two universal or swivel joints.

Yet another object of the present invention is to provide a novel swivel or universal joint which may be used in a tool of the type described.

Many other advantages, features and additional objects of the present invention will become manifest to those versed in the art upon making reference to the detailed description and the accompanying sheets of drawings in which preferred structural embodiments incorporating the principles of the present invention are shown by way of illustrative examples.

On the drawings:

FIGURE 1 is a side elevational view of a reamer provided with a removable cutting head which is self adjustable and self locking in accordance with the principles of the present invention;

FIGURE 2 is an enlarged elevational view of the reamer of FIGURE 1, taken along line II—II;

FIGURE 3 is an enlarged cross-sectional view taken along line III—III of FIGURE 1, with the deatils of the cutter attachment means omitted;

FIGURE 4 is a much enlarged fragmentary view of a portion of the structure shown in FIGURE 2;

FIGURE 5 is an enlarged elevational view, partly in cross-section, of a modified form of my invention; and FIGURE 6 is an enlarged cross-sectional view of a still further modified form of my invention.

As shown on the drawings:

The principles of this invention are particularly useful when embodied in a reamer assembly such as illustrated in FIGURE 1, generally indicated by the numeral 10. The reamer assembly 10 includes a holder generally indicated by the numeral 11, and a cutter or cutter head generally indicated by the numeral 12. The holder of FIGURE 1 has been provided with a straight portion 13 which may be rigidly supported by a machine tool, such as a turret of a turret lathe. It is to be understood that the construction of the straight portion 13 in the instant embodiment does not comprise a part of this invention. Accordingly, other conventionl means may be provided at this one end for supporting the holder.

The holder 11 further includes a hollow shank 14, the details of which may be seen more clearly in FIGURE 2. The shank 14 of the holder 11 is provided with a shoulder 15 which is directed away from the other end of the holder, and which is perpendicular to the principal axis of the holder 11. It will be noted that the outside diameter of the shank 14 is less than the overall diameter or dimension of the cutter 12. The shank 14 is generally cylindrical or tubular since an axially extending recess 16 extends therethrough, terminating at one end in an opening which intersects the shoulder 15. At the inner end of the recess 16, there is a generally cylindrical portion which is provided with internal threads 17 of any standard configuration. It is to be noted that the inside or minor diameter of the threads 17 is somewhat less than the inside diameter or dimension of that portion of the recess 16 which is disposed between the shoulder 15 and the threads 17. It will be appreciated that when a left hand cutter is employed, the threads 17 will be left hand threads, and when a right hand cutter is employed, the threads 17 will be provided as right hand threads.

The blank from which the cutter 12 is made is provided with a chamfer 18 on the leading end, and thus a particular blank may be made into either a left hand cutter or a right hand cutter. Because of this dual aspect of the cutter blank, the cutter 12 is provided with a pair of recesses 19, 19, each of which is adapted to receive a head 20 which comprises a part of an elongated cutter attachment means 21. The bottom of or shoulder 19a in each recess 19 is concave, having a relatively large radius of curvature, and the inner face 20a of the head 20 is convex, and has a corresponding radius of curvature to insure surface-to-surface engagement when the axes of the cutter 12 and the means 21 are angularly misaligned, as shown.

Immediately adjacent to the head 20, the elongated attachment means 21 is provided with a generally egg-shaped portion 22 which has slidable and rocking engagement with a substantially cylindrical surface 23 on the interior of the cutter 12. This structure thus permits swiveling between the attachment means 21 and the cutter 12. At this end of the elongated cutter attachment means 21, the swivel connection or universal joint also includes a pin 24 directed transversely through the egg-shaped portion 22 and extending radially therefrom for engagement in slots 25, 25, best seen in FIGURE 3. The pin 24 thus provides a non-circular driving connection between the cutter attachment means 21 and the cutter 12.

An intermediate portion 26 of the cutter attachment means 21 is provided with a transverse dimension, such as a diameter, which is less than that of the recess 16, whereby there is a peripheral clearance about the cutter attachment means 21 at the opening in the shoulder 15, such peripheral clearance extending inwardly to the threads 17.

At the inner end of the cutter attachment means 21, there is disposed a second swivel connection or universal joint, generally indicated by the numeral 27. The swivel connection 27 includes the threads 17 as already described. In addition, the inner end of the cutter attachment means 21 is provided with a generally egg-shaped formation 28 which has a set of external threads 29 which cooperate with the threads 17. This structure permits the inner end of the cutter connecting means 21 to swivel with respect to the holder 11.

Referring now to FIGURE 4 there is shown an enlarged fragmentary portion of the inner end of the cutter attachment means 21, FIGURE 4 representing a quadrant-like portion thereof. Thus the inner egg-shaped formation 28 is provided with the external threads 29 which engage with the threads 17, the threads 17 comprising a surface of non-egg-shaped formation in that they are disposed on the interior of a generally cylindrical surface. The crests or outside diameters 30 of the various threads 29 jointly define a generally egg-shaped formation having a radius of curvature or arc extending in the general direction of the principal axis. The thread or threads at the center of the egg-shaped formation have a pitch diameter which is represented by the line 31, and such threads as are axially spaced therefrom progressively have a slightly smaller pitch diameter represented by the line 32. Thus it will be noted that the line 32 representing the actual pitch diameters of all of the threads also defines a surface of revolution of generally egg-shaped formation having a principal axis extending longitudinally of the elongated cutter attachment means 21.

I have found a method by which the pitch diameter described, which tapers axially, may be readily produced. First, an egg-shaped configuration is formed on the end of the member 21, in this instance as defined by the crests 30 of the threads 29. It will be noted that the slope of this taper is somewhat greater than the resulting slope of the pitch diameter. Thereafter, a die is passed entirely across the tapered portion, such die having an axial length which is less than that of the taper. By way of example, if the axial length of the swivel connection 27 is about three-eighths inch, and its diameter is approximately three-eighths inch, the initial radius of curvature of an arc extending generally in an axial direction would typically be about three-fourths inch. In this example a die would be employed which has an axial length less than that of each taper, or less than one-half of the axial length of the double taper illustrated. Where the dimensions are as given in the above example, a die having an axial length of one-eighth inch could be employed. I have found that a taper of .005 inch in the pitch diameter is to be expected for the example given, illustrated by "X" in FIGURE 4. Threads of the type shown in FIGURE 4 readily engage with corresponding standard threads, "standard" being defined as corresponding threads not having a deliberately tapered crest or pitch diameter.

As best seen in FIGURE 2, it is apparent that the outer end of the elongated cutter attaching means 21 may be moved radially by an amount permitted by the clearance it has with respect to the holder at the shoulder 15, such radial movement constituting swiveling wherein there is an angular misalignment between the axes of the holder 11 and the means 21. It is also apparent that each of the universal joint connections illustrated are enclosed respectively by the cutter 12 and the holder 11.

So far as I am aware, the swivel joint connection 27 is also patentably novel, and of course it may be utilized for purposes other than that specifically disclosed herein.

When the cutting tool assembly 10 is to be employed, it is supported at 13 in a conventional manner, but with the threads of the swivel connection 27 left in a loose condition. This permits the fluted cutter 12 to move radially in response to any radial force applied thereto. When there is slightly axial misalignment of an offset type, between the holder 11 and the aperture in the workpiece which is to be reamed, the edges of such aperture act on the cutting edges of the cutter 12 to cause the cutter 12 to shift radially to a position wherein the cutter 12 is coaxial with the aperture to be reamed. FIGURE 2 illustrates an extreme condition of adjustment wherein a force has been applied radially to the cutter 12 to cause a maximum permissible amount of shift to occur. Thus the cutter 12 is radially slidable in response to an initial radial load applied thereto. Thereafter, the friction between the cutter and the workpiece causes the cutter to rotate with respect to the holder 11, and since the pin 24 effects corotation between the cutter 12 and the elongated means 21, the threads of the swivel connection 27 are caused to tighten. Thus the threads are tightened in response to a cutting torque applied to the cutter 12 to lock the cutter 12 at a place or position with respect to the shoulder 15 which is determined by the initial radial load. Thus that end face 33 of the cutter which is disposed against the shoulder 15 has a rigid frictional connection therewith precluding further movement of the cutter with respect to the holder 11.

When it is desired to loosen the fluted cutter to replace it or to permit realignment, an ordinary end wrench may be applied across the teeth thereof. Such wrench acts solely against the back or non-sharpened portion of the engaged teeth to effect loosening of the cutter without bearing against any actual cutting edge.

It is to be understood that the instant invention may be constructed in various forms, and the size of the resulting cutter is one of the factors which determines which form of the invention is preferable. To illustrate, the form of the invention shown in FIGURE 2 is preferable when the overall length of the cutter assembly is about five inches or longer. The form of the invention illustrated in FIGURE 5 may have an overall length of about 2½ inches, and is preferable for smaller diameter cutters, since this construction permits further reduction in cutter diameter. Otherwise, however, the holder of the embodiment shown in FIGURE 5 is identical to that shown in FIGURE 2, and therefore similar reference numerals have been applied. However, in this embodiment, the elongated cutter attachment means 21a has been provided with a swivel connection 27 not only at the inner end, but has been provided with an identical connection 34 at the outer end. The threads 35 in the cutter 36 are identical to the threads 17 in the holder 11. The cylindrical surface or recess 37 in the cutter 36 may extend all the way through the cutter 36 in the manner that the cylindrical surface 23 extends through the cutter 12 of FIGURE 2. However, when the recess 37 is made blind as shown in FIGURE 5, only one engageable end face 38 is provided on the cutter for engagement with the shoulder 15 of the holder 11.

The cutter assembly of FIGURE 5 is used in the same manner as that described for FIGURE 2. It is apparent that either or both of the sets of threads in the swivel connections 27, 34 will tighten in response to cutting torque applied to the cutter 36. It is thus apparent that the provision of a positive driving connection between the cutter 36 and the elongated means 21 is not necessary.

Referring now to FIGURE 6, a further embodiment of the instant invention is illustrated. This embodiment permits the invention to be embodied in a shorter holder than shown in FIGURE 2. That portion of the figure lying to the left of the left break line is identical to that lying to the left of the break lines in FIGURE 2, and therefore similar reference numerals have been applied.

The structure of FIGURE 6 includes a holder 40 which has a bore extending completely therethrough terminating in a cup-shaped portion 41 within the portion 42 thereof by which the holder 14 is held. Received within the cup-shaped portion 41 is a hemispherically-shaped portion 43 comprising an end of an elongated cutter attachment means 44. The cup-shaped portion 41 permits the hemispherically-shaped portion 43 to swivel therein, and hence the portions 41, 43 jointly comprise a swivel connection or universal joint disposed within the holder 40. Preferably, the holder 40 includes a pin 45 rigidly secured to one of the portions and extending therefrom for reception in a socket 46 carried at any convenient location on the other of said portions. The cutter attachment means 44 includes portions 47 and 48 which are threaded together as at 49, there being an axial clearance 50 to insure that the cutter 12 will always be securely tightened against the shoulder 15.

The structure of FIGURE 6 operates similarly to that already described, in that the cutter 12 is radially slidable in response to an initial radial load or force, such slidability being permitted by a pair of universal joints or swivel connections, and the cutter attachment means 44 including threads 49 which tighten in response to a cutting torque applied to the cutter 12 to lock the cutter at a place in engagement with the shoulder 15 which is determined by the initial radial force thereon.

It is thus apparent that the embodiments shown in FIGURES 5 and 6 also employ cutters which are self-aligning and self-tightening in a place where the cutter is axially aligned with the aperture to be reamed and where the axis of the cutter is offset from the axis of the holder.

Although various minor modifications might be suggested by those versed in the art, it should be understood that I wish to embody within the scope of the patent warranted hereon all such embodiments as reasonably and properly come within the scope of my contribution to the art.

1. A cutting tool comprising in combination: a holder adapted at one end to be securely held in a chuck, said holder having a shoulder directed away from said one end and lying perpendicular to the principal axis of said holder; an elongated recess extending axially in said holder and opening into the plane of said shoulder; a detachable fluted cutter having an end face in engagement with said shoulder and slidable in a radial direction while in said engagement in response to an initial radial load; said cutter having an axially directed recess opening into the plane of said shoulder and aligned with the shoulder recess; elongated means received in said recesses, said means having at one end a swivel connection with said cutter, and having at the opposite end a swivel connection with said holder, said elongated means including threads arranged to be tightened in response to a cutting torque applied to said cutter to thereby frictionally lock said cutter against said shoulder at a place determined by said initial load.

2. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load.

3. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means disposed within said cutter and said holder, said means having a universal joint connection with each of said cutter and said holder, that portion of said means which is within said holder having a clearance with said holder throughout the length of said portion except at its universal joint connection with said holder, said means being adapted to lock said cutter against said shoulder, in response to a cutting torque applied jointly with said initial radial load, at a place against said shoulder determined by said initial radial load.

4. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load; each of the universal joint connections being respectively enclosed by said cutter and by said holder.

5. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load; at least one of said universal joint connections including a generally egg-shaped formation secured to an end of said cutter attachment means, said generally egg-shaped formation being engageable with a surface of non-egg-shaped formation.

6. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load; at least one of said universal joint connections including a generally egg-shaped formation secured to an end of said cutter attachment means, said egg-shaped formation being externally threaded and engageable with the exterior of a generally cylindrical internally threaded surface.

7. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load; at least one of said universal joint connections including an externally threaded end of said cutter attachment means, the outside diameters of the external threads jointly defining a generally egg-shaped formation, said threaded end being received in and engaging with a cylindrical recess having standard internal threads.

8. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load; at least one of said universal joint connections including an externally threaded end of said cutter attachment means, the outside diameters of the external threads jointly defining a generally egg-shaped formation, the pitch diameters of the external threads also jointly defining a generally egg-shaped formation, said threaded end being received in and engaging with a cylindrical recess having standard internal threads.

9. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load; at least one of the universal joint connections being enclosed by said holder.

10. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radal load; at least one of said universal joint connections including an externally threaded formation secured to an end of said cutter attachment means and engaging with standard internal threads, the external threads of said formation having major diameters which, as a group, jointly define a generally egg-shaped configuration, whereby the axes of said internal and external threads may be angularly misaligned.

11. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load; at least one of said universal joint connections including an externally threaded formation secured to an end of said cutter attachment means and engaging with standard internal threads, the external threads of said formation having major diameters which, as a group, jointly define a generally egg-shaped configuration having a longitudinal radius of curvature, the pitch diameters of the external threads jointly defining a generally egg-shaped configuration of greater longitudinal radius of curvature than that of said major diameters, whereby the axes of said internal and external threads may be angularly misaligned.

12. A cutting tool comprising in combination: a holder adapted at one end to be securely held in a chuck, said holder having a shoulder directed away from said one end and lying perpendicular to the principal axis of said holder; an elongated recess extending axially in said holder and opening into the plane of said shoulder; a detachable fluted cutter having an end face in engagement with said shoulder and slidable in a radial direction while in said engagement in response to an initial radial load; said cutter having an axially directed recess opening into the plane of said shoulder and aligned with the shoulder recess; elongated means received in said recesses, said means having at one end a swivel connection with said cutter, and having at the opposite end a swivel connection with said holder, at least one of said swivel connections including an externally threaded end on said elongated means, and a recess having standard internal threads on one of said cutter and said holder mating therewith, the outside diameters of the externally directed threads jointly defining a generally egg-shaped configuration having a longitudinal radius of curvature, and the pitch diameters of the externally directed threads jointly defining a generally egg-shaped configuration of greater longitudinal radius of curvature than that of said outside diameters, that portion of said elongated means which is within said holder having a peripheral clearance therewith throughout the length of said portion except at its swivel connection with said holder, said threads being adapted to lock said cutter against said shoulder, in response to a cutting torque applied jointly with said initial radial load, at a place against said shoulder determined by said initial radial load and to which said swivel connections jointly permit said cutter to move radially.

13. A cutting tool comprising in combination: a holder adapted at one end to be securely held in a chuck, said holder having a shoulder directed away from said one end; a cutter having an end face in engagement with said shoulder and slidable in a radial direction while in said engagement in response to an initial radial load; and cutter attachment means having a universal joint connection with each of said cutter and said holder, and adapted to lock said cutter against said shoulder, in response to a cutting torque applied jointly with said initial radial load, at a place against said shoulder determined by said initial radial load, one of said universal joint connections including a generally egg-shaped formation secured to an end of said cutter attachment means, said generally egg-shaped formation being engageable with a surface of non-egg-shaped formation in said cutter; said cutter having a concave surface directed away from said holder; and a head on said cutter attachment means adjacent to said generally egg-shaped formation, said head having a convex surface disposed against said concave surface of said cutter.

References Cited in the file of this patent

UNITED STATES PATENTS

| | | | |
|---|---|---|---|
| 1,064,546 | Ryan | June 10, | 1913 |
| 1,491,874 | Martell | Apr. 29, | 1924 |
| 1,999,816 | Lindenmuth et al. | Apr. 30, | 1935 |
| 2,380,944 | Cole | Aug. 7, | 1945 |
| 2,407,160 | Kahn | Sept. 3, | 1946 |
| 2,768,393 | Sayce | Oct. 30, | 1956 |
| 2,936,659 | Garberding | May 17, | 1960 |